D. L. GROVER.
Improvement in Dasher-Staffs for Churns.
No. 125,453.  Patented April 9, 1872.
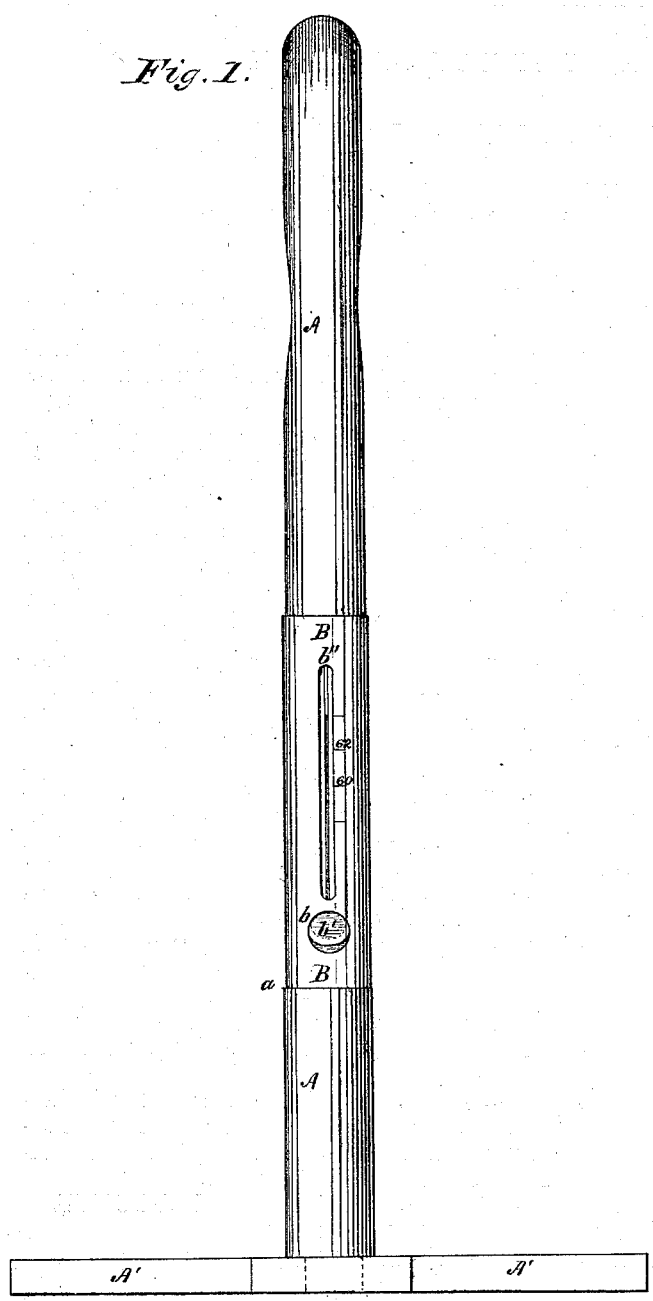
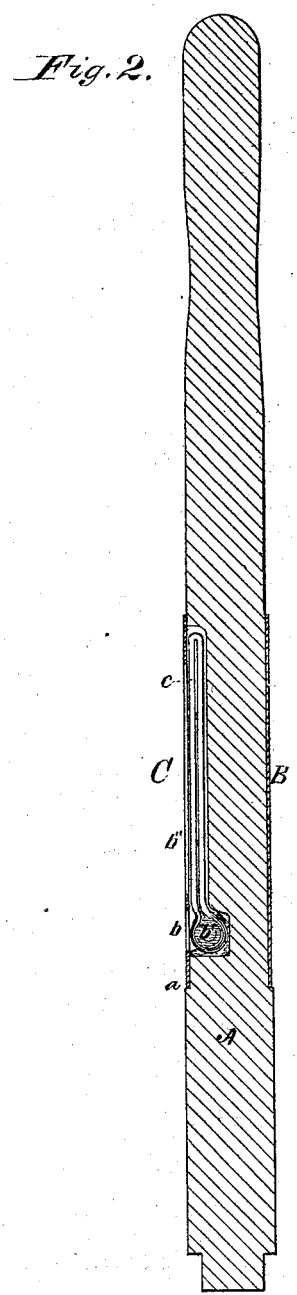

UNITED STATES PATENT OFFICE.

DEMAS L. GROVER, OF GROTON, NEW YORK.

IMPROVEMENT IN DASHER-STAFFS FOR CHURNS.

Specification forming part of Letters Patent No. 125,453, dated April 9, 1872.

I, DEMAS L. GROVER, of Groton, in the county of Tompkins, in the State of New York, have invented certain Improvements in Dasher-Staffs of Churns, of which the following is a specification:

This invention is an improvement on that patented by me on the 17th day of October, 1871, and numbered 119,980; and it consists in the construction and arrangement of the parts that compose the dasher-staff, as is hereinafter more fully described.

In the drawing, Figure 1 is an upright view of the dasher-staff when complete in all its parts. Fig. 2 is a sectional view of Fig. 1 on a line from the front to the rear.

A represents the dasher-staff, which is whole, or in one piece of wood or other material adapted to its use, and has a square shoulder at $a$ to receive the thickness of the cylinder. A' represents the dasher attached to the lower end of the staff in the usual manner. B is a loose protecting removable cylinder or ferrule, a trifle larger in diameter at its base, where it rests upon shoulder $a$ of the staff A, than at its top end. On one side of this cylinder is a hole, $b$, which may be round, but preferably oblong in a perpendicular direction. Above this hole $b$, and in the cylinder, is a long slot or opening, $b''$, on one side of which is a scale of degrees plainly marked. This cylinder can be removed from the staff at any time, or it can be revolved around on the staff; as it is made slightly tapering, it will easily slide upward or toward the top of the staff. C is a thermometer, with its stem $c$ and bulb $b'$, securely embedded in the staff, as seen in Fig. 2, and having the bulb bent back, so that its front shall project no further than the stem $c$, and all be embedded in the staff, so as not to touch the cylinder B when it is put on and forced down to its place. When the thermometer is thus embedded in the staff and secured therein in any secure manner, the cylinder is put in position, so that the hole $b$ therein will be directly before and expose the bulb $b'$ of the thermometer to view and to the cream or milk in the churn. The stem of the thermometer will also be coincident with the slot $b''$, so that the mercury in the stem can be seen, and then the scale of degrees that denotes the temperature can be correctly marked and seen thereon. When the dasher-staff is not in use the cylinder B can be turned around the staff, so that the bulb and stem of the thermometer will be covered by the whole part of the cylinder, and thus protect it from any liability or danger of being broken; and by removing the cylinder entirely from the staff both it and the staff around the thermometer can be thoroughly cleansed and dried after use, which is a great advantage over other constructions. Thus the advantage this staff has over others that have a thermometer are, safety from ordinary danger of breaking the thermometer, its adaptability to easy cleaning, and the staff being in a single piece.

Having thus described my invention, what I claim, and desire to secure by Letters Patent, is—

The thermometer C embedded in the dasher-staff A, and protected by the removable rotating cylinder B, when arranged in the manner substantially as described.

DEMAS L. GROVER.

Witnesses:
LORENZO PENNOYER,
E. P. GROVER.